L. B. OLIVER.
SODA FOUNTAIN.
APPLICATION FILED JAN. 18, 1918.

1,299,767.

Patented Apr. 8, 1919.
5 SHEETS—SHEET 1.

Inventor:
L. B. Oliver

L. B. OLIVER.
SODA FOUNTAIN.
APPLICATION FILED JAN. 18, 1918.

1,299,767.

Patented Apr. 8, 1919.
5 SHEETS—SHEET 3.

Inventor:
L. B. Oliver

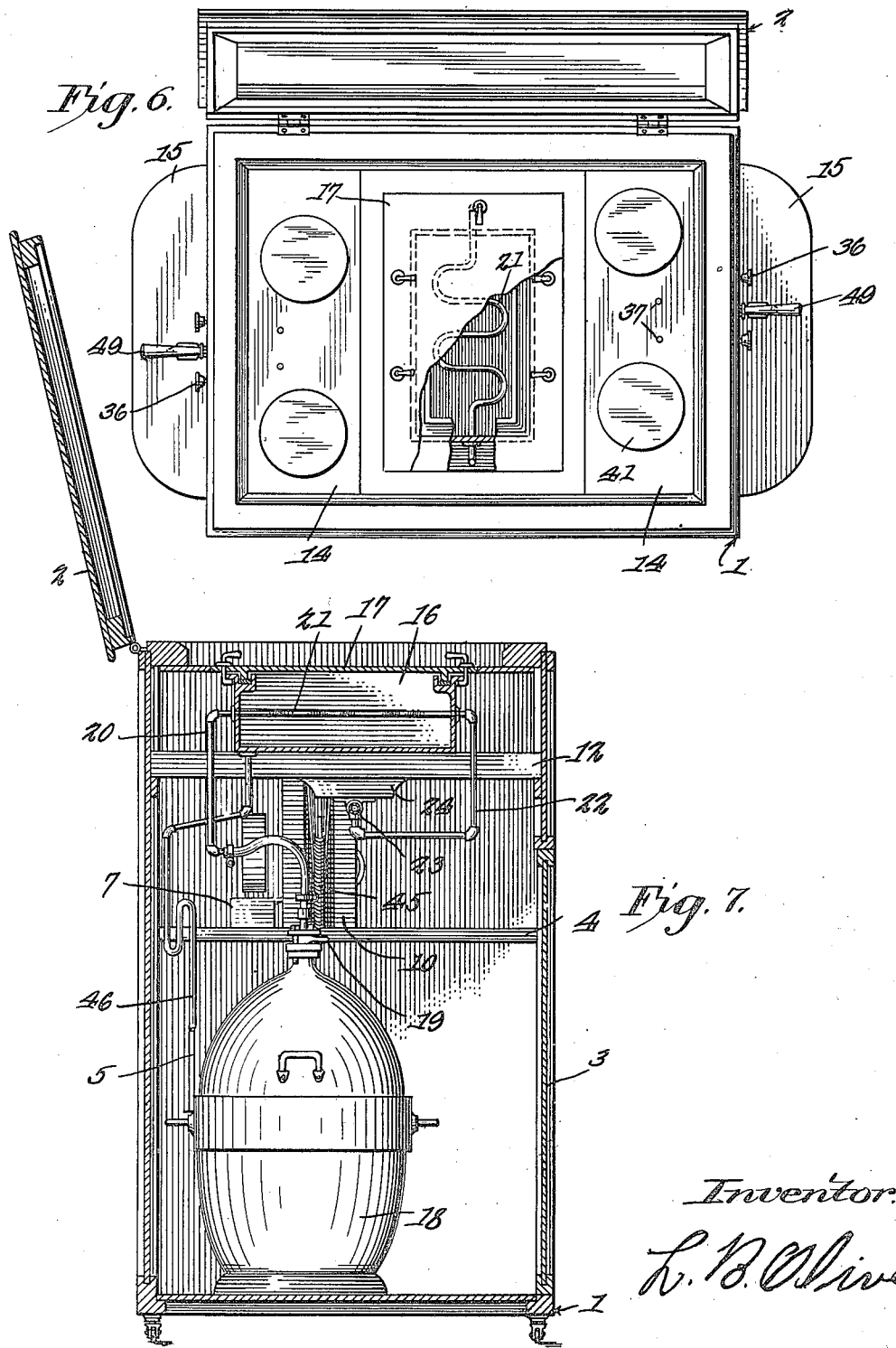

L. B. OLIVER.
SODA FOUNTAIN.
APPLICATION FILED JAN. 18, 1918.
1,299,767.
Patented Apr. 8, 1919.
5 SHEETS—SHEET 5.
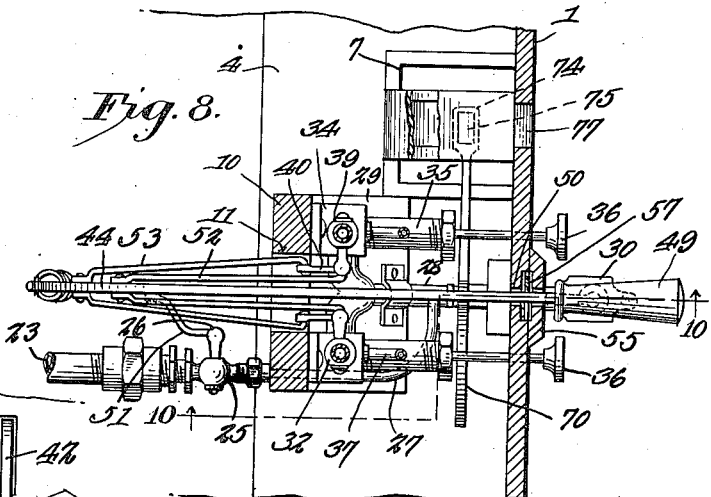
Fig. 8.
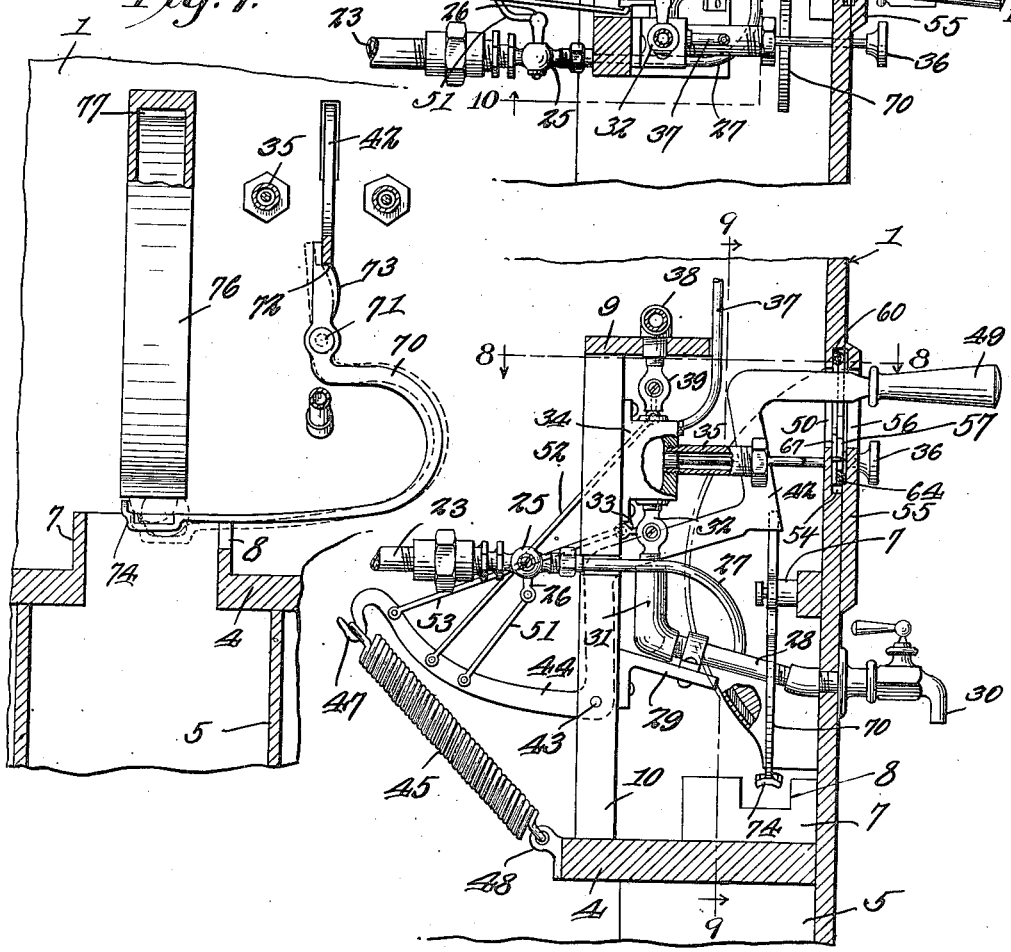
Fig. 9.
Fig. 10.
Inventor
L. B. Oliver

UNITED STATES PATENT OFFICE.

LUTHER B. OLIVER, OF MEBANE, NORTH CAROLINA.

SODA-FOUNTAIN.

1,299,767. Specification of Letters Patent. Patented Apr. 8, 1919.

Application filed January 18, 1918. Serial No. 212,457.

*To all whom it may concern:*

Be it known that I, LUTHER B. OLIVER, a citizen of the United States, residing at Mebane, in the county of Alamance and State of North Carolina, have invented a new and useful Soda-Fountain, of which the following is a specification.

The device forming the subject matter of this application is a soda fountain, and the object of the invention is to improve the dispensing mechanism.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the drawings:

Fig. 6 is a top plan, similar to Fig. 4, but showing the ice chest in place, parts being broken away;

Fig. 7 is a vertical section taken in a plane at right angles to the cutting plane of Fig. 3, the lid being open;

Fig. 8 is a fragmental horizontal section taken on a line hereinafter referred to;

Fig. 9 is a fragmental vertical section showing a portion of the coin controlled mechanism;

Fig. 10 is a vertical section disclosing the operating lever and other portions of the dispensing mechanism, the line 8—8 denoting the cutting plane of Fig. 8.

Figure 1:
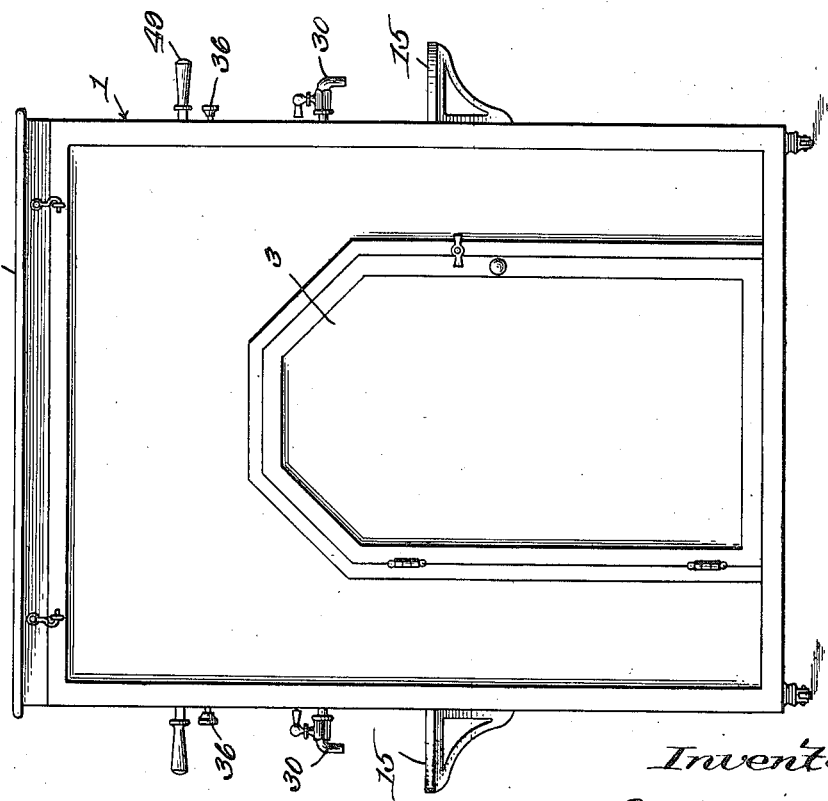
Figure 1 shows in side elevation, a soda fountain constructed in accordance with the invention.
Figure 3:
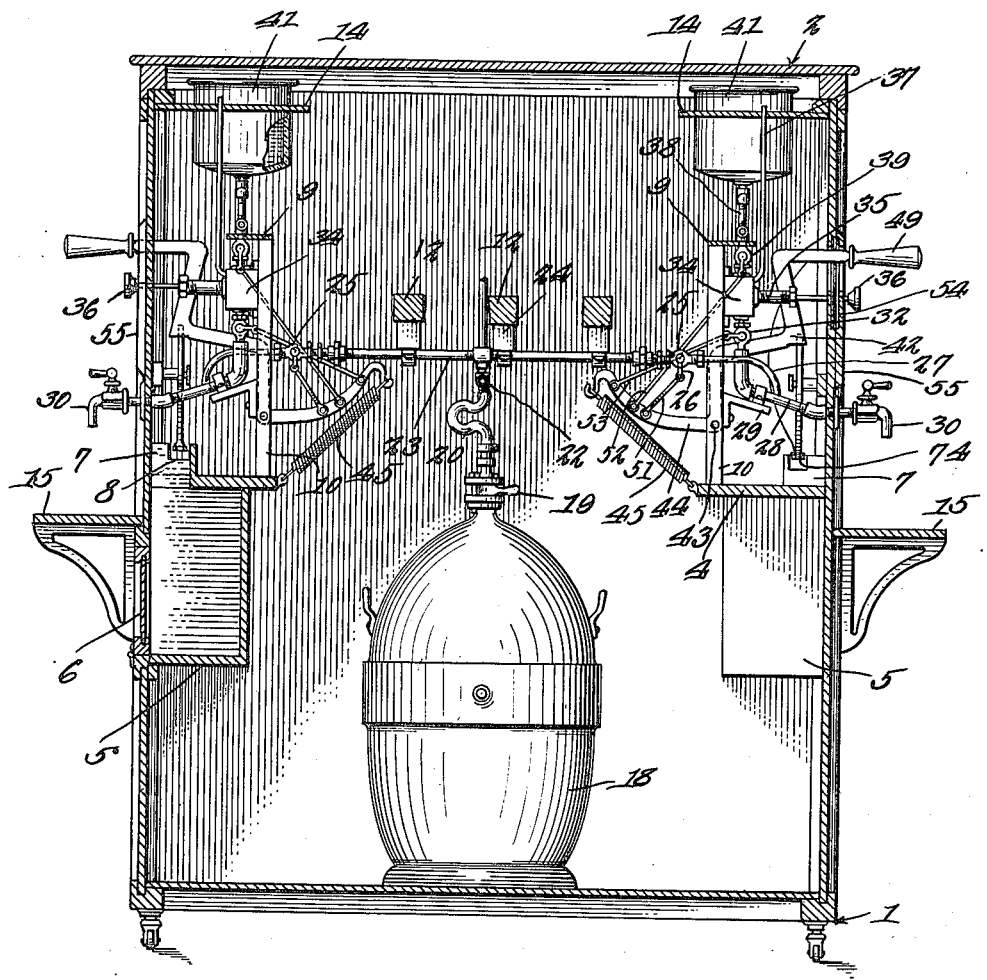
Fig. 3 is a vertical section wherein parts have been omitted.
Figure 4:
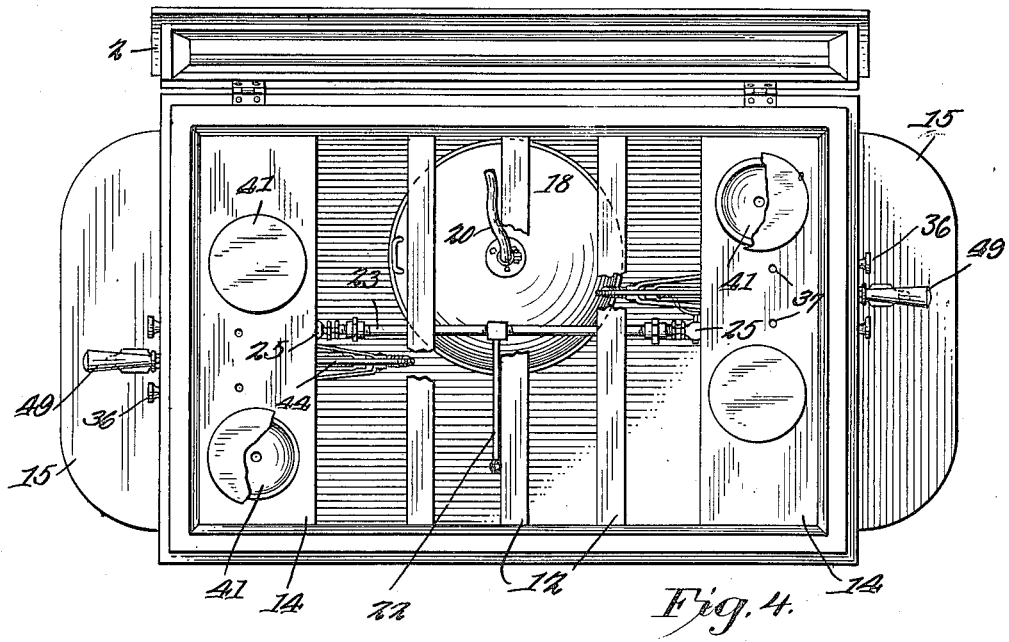
Fig. 4 is a top plan, the lid being open, parts being broken away, and parts being omitted.

In carrying out the invention, there is provided a supporting structure preferably in the form of a case 1 having a hinged lid 2. Access to the interior of the case 1 is had through a hinged side door 3 shown in Fig. 1. Platforms 4 extend across the case 1 and constitute partial closures for the upper ends of coin boxes 5, there being doors 6 in the case 1, which afford access to the coin boxes. The platforms 4 have upstanding necks 7 communicating with the coin boxes 5, the necks having notches 8 in their upper ends. Uprights 10 are carried by the platforms 4 and are supplied with openings 11. Platforms 9 are supported on the upper ends of the members 10. Bars 12 extend across the case 1, between the uprights 10. The case 1 is provided on its outside with oppositely disposed shelves 15, and in the interior of the case, near to the top thereof, are shelves 14 located above the platforms 9.

An ice chest 16 is supported on the cross bars 12 and is supplied with a drain pipe 46 which may lead to a sewer or elsewhere, the ice chest including a removable lid 17. A tank 18 is located in the case 1, and is adapted to contain charged water, the tank embodying a cut off valve 19 of the common sort which is opened to put the device into operation initially. From the top of the tank 18, a pipe 20 leads, the pipe passing through the ice chest 16, and being looped as shown at 21, or otherwise arranged, within the ice chest, to present an increased length of piping within the ice chest, to the end that the liquid proceeding from the tank 18 may be cooled sufficiently. The pipe 20 extends as shown at 22, exteriorly of the ice chest 16, to a cross pipe 23.

The cross pipe 23 is supported on cleats 24 carried by the bars 12. In the present embodiment of the invention, two dispensing mechanisms and two coin controlled mechanisms are provided, but it will be understood that these portions of the structure may be duplicated to any desired extent. Since the coin controlled mechanisms are alike, and since the dispensing mechanisms are alike, and in view of the fact that there is no novelty in mere duplication, the specification will proceed from this point in the singular number.

A valve 25 is interposed in the pipe 23 and is operated by means of an arm 26. The pipe 23 leads, as shown at 27, to an outlet pipe 28 supported on a bracket 29 carried by the upright 10. Exteriorly of the case 1, the outlet pipe 28 carries a spigot 30 disposed above the shelf 15. The inner end of the outlet pipe 28 communicates with a Y 31. Valves 32 are located in the branches of the Y 31 and are operated by means of arms 33.

Receptacles 34 are secured to the upright 10 and with the bottom portions of these receptacles, the respective valves 32 communicate. The receptacles 34 have outwardly projecting tubular extensions 35 in which plungers 36 are mounted to reciprocate, the plungers being accessible from the outside of the case 1 and constituting charge-regulating members. Air vent pipes 37 open into the receptacles 34 and pass upwardly through the shelf 14. Pipes 38 lead upwardly from the receptacles 34, and in the pipes are interposed valves 39 operated by arms 40. The pipes 38 communicate with containers 41 carried by the shelf 14.

The numeral 42 marks an operating lever of angular form, disposed in the opening 11 of the upright 10 and fulcrumed on the upright as shown at 43. The lever 42 embodies an arcuate inner end 44 terminating in a hook 47 wherewith is assembled one end of a retractile spring 45, the other end of which is attached at 48 to the platform 4. The lever 42 works in a slot 50 fashioned in the case 1 and carries, exteriorly of the case, a handle 49 whereby the lever may be tilted conveniently upon its fulcrum 43. A link 51 is pivoted to the arm 26 of the valve 25 in the pipe 23 and is pivoted to the end 44 of the lever 42. Links 52 are pivoted to the arms 40 of the valves 39, the links being pivoted to the part 44 of the lever 42. Links 53 are pivoted to the arms 33 of the valves 32 and are pivoted to the part 44 of the lever 42.

Figure 2:
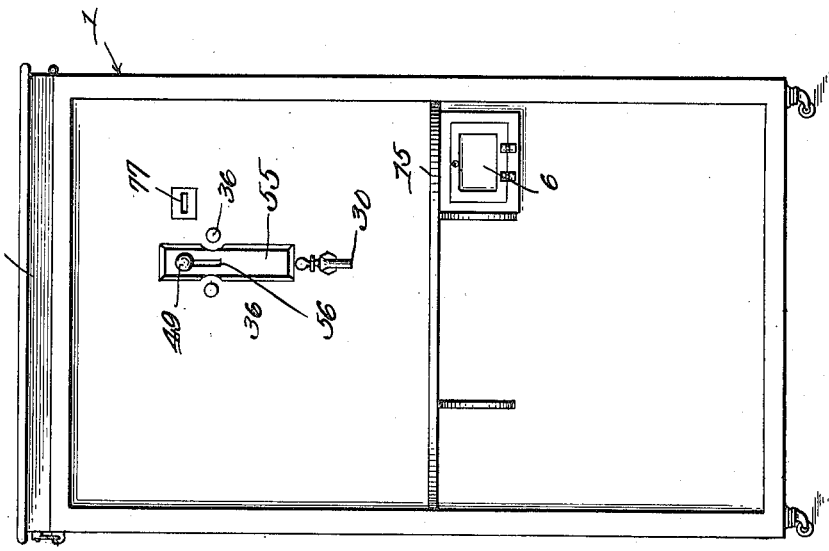
Fig. 2 is a front elevation of the fountain.
Figure 5:
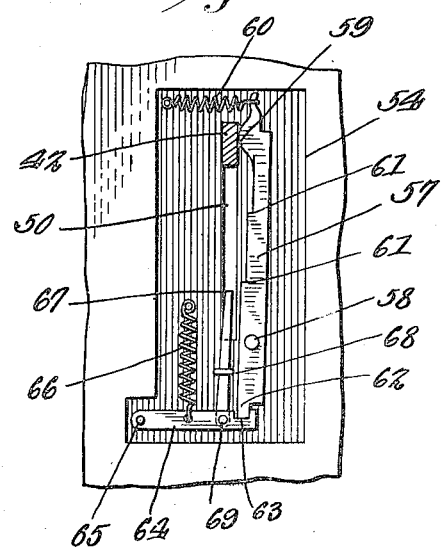
Fig. 5 is a fragmental elevation showing a part of the locking mechanism for the operating lever, the latter element appearing in section.

Noting Fig. 10 and referring to Fig. 5, it will be seen that a recess 54 is fashioned in the wall of the case 1, about the slot 50 wherein the operating lever 42 works. The recess 54 is closed by means of a face plate 55, shown in Fig. 2, and provided with a slot 56 in which the lever 42 operates. A detent 57 is disposed in a substantially vertical position within the recess 54 and is fulcrumed intermediate its ends, as shown at 58, upon the wall of the case 1. Adjacent its upper end, the detent 57 is supplied with a lateral cam projection 59 which extends toward the slot 50. One end of a retractile spring 60 is attached to the upper end of the detent 57, the other end of the spring being secured to the wall of the case 1. That edge of the detent 57 which is adjacent the slot 50 is provided with shoulders 61, there being a reduced finger 62 at the lower end of the detent. A substantially horizontal latch 64 is pivoted at one end to the case 1 as shown at 65, the latch being supplied in its upper edge and near to its free end with a seat 63 wherewith the finger 62 of the detent 57 coacts. The latch 64 is drawn upwardly by means of a retractile spring 66 made fast at one end to the case 1 and secured at its other end to the latch intermediate the ends of the latch. The lower end of a releasing rod 67 is pivoted at 69 to the latch 64, the releasing rod being mounted to reciprocate, in alinement with the slot 50, in an eye 68 carried by the case 1. The several parts above alluded to are located in the recess 54 and are covered by the face plate 55.

A falciform locking lever 70 is provided and is fulcrumed intermediate its ends as indicated at 71 upon the wall of the case 1. Near its upper end, the locking lever 70 is supplied with a transverse shoulder 72 adapted to engage beneath the operating lever 42 as shown in Fig. 9, the locking lever having a cam projection 73 disposed below the shoulder 72. The lower portion of the locking lever 70 works through the notch 8 in the neck 7 which leads to the coin box 5 and terminates in an enlarged head 74 in which there is an opening 75. The head 74 and its opening 75 are located below a coin chute 76 disposed inside of the case 1 and carried by that wall of the case wherein the slot 50 is located. A coin may be inserted into the chute 76 through an opening 77 appearing in Fig. 8 and shown in Fig. 2.

Considering the relative relations of the parts of the coin controlled mechanism before a coin has been inserted. Under such circumstances, the shoulder 72 on the locking lever 70 is disposed beneath the operating lever 42 as shown in Fig. 9, and the handle end 49 of the operating lever cannot be swung downwardly to tilt the operating lever on its fulcrum 43. Noting Fig. 5, it will be observed that the finger 62 on the detent 57 is engaged in the seat 63 of the latch 64, the free end of the latch being drawn upwardly by the spring 66, the detent being held by the latch against the action of the spring 60, so that the cam projection 59 on the detent is disposed at one side of the slot 50, out of the path of the operating lever 42.

A coin is inserted into the chute 76 through the slot 77 and drops into the opening 75 in the locking lever 70, the coin resting, adjacent its upper edge, against the lower end of the coin chute. The weight of the coin tilts the locking lever 70 sufficiently to withdraw the shoulder 72 from beneath the operating lever 42, but the locking lever is not tilted, by the weight of the coin, enough so that the coin is freed from the coin chute 76. When the shoulder 72 is withdrawn from beneath the operating lever 42 as aforesaid, the handle end 49 of the locking lever is swung downwardly, and as the lever swings downwardly, it traverses the cam projection 73 of the locking lever 70 and tilts the locking lever sufficiently so that the coin is disengaged from the lower end of the chute 76. The coin then topples over, falls off the end of the locking lever 70 and drops into the coin box 5 through the neck 7.

Reverting to Fig. 5, it will be understood that the operating lever 42 moves downwardly in the slot 50 until the lever strikes the releasing rod 67. The latch 64 is swung on its fulcrum 65 against the action of the spring 66, and the seat 63 of the latch is disengaged from the finger 62 of the detent 57, whereupon the detent swings on its fulcrum 58, due to the pull of the spring 60, until the cam projection 59 on the detent is disposed in front of the slot 50, the shoulders 61 on the detent being moved to a similar position with respect to the slot. When the lever 42 is swung upwardly, the pressure on the releasing rod 67 is removed, and the free end of the latch 64 swings upwardly, responsive to the spring 66. The finger 62 is not received in the seat 63 at this time, because the finger has been moved to the right (Fig. 5) by the action of the spring 60 on the detent 57, the latch 64 simply being swung up by the spring 66 until the extreme right hand end of the latch, to the right of the seat 63, abuts against the lower end of the finger 62 on the detent. Let it be supposed that the operator attempts to work the lever 42 repeatedly, after the insertion of a single coin. If the lever 42 is elevated to the position of Fig. 5 before the next down stroke is made, the lever locks above the shoulder 72 on the lever 70, as shown in Fig. 9, and a down stroke is impossible until the lever 72 has been operated again by the insertion of a coin, as hereinbefore described. When the lever 42 is raised to the position of Fig. 5, the lever coöperates with the cam projection 59 on the detent 57, the lower end of the detent is swung to the left (Fig. 5), the free end of the latch 64 rises due to the impulse of the spring 66, and the finger 62 on the detent is received in the seat 63 of the latch, the parts being restored to the position shown in Fig. 5. Suppose, however, that while the extreme right hand end of the latch 64 rests against the lower end of the finger 62 under the pull of the spring 66, and while the shoulders 61 are in front of the slot 50, the operator makes a short upward stroke of the lever 42 and attempts to swing the lever downwardly again. Then the detent 57 will tilt to a slight extent on its fulcrum 58 to permit the lever 42 to move upwardly above one or both of the shoulders 61, the spring 60 reacting on the detent to restore the shoulder or shoulders to a position beneath the lever. During this operation, the lower end of the finger 62 slides on the extreme right hand end of the latch 64, but the oscillation of the detent 57 is not sufficient to cause the finger to engage in the seat 63 of the latch 64. Since the shoulders 61, or one of them, are disposed below the lever 42, a second downward stroke of the lever cannot be made. A continuation of the upward stroke of the lever 42, only, is possible, and ultimately the lever 42, responding to the action of the spring 45 shown in Fig. 10, resumes the position indicated in Fig. 5, the lever 42 engaging with the shoulder 72 of the locking lever 70 and coöperating with the cam projection 59 on the detent 57 to tilt the detent into the position shown in Fig. 5, thereby to restore the parts to the position delineated in that figure.

The operation outlined above renders it clear that the lever 42 may be tilted on its fulcrum 43 after a coin has been inserted into the machine, and points out that repeated oscillations of the lever after the insertion of a single coin, are impossible. The function of the lever 42, as a part of the dispensing mechanism, will now be taken up.

One of the containers 41 is filled with flavoring, the other container being filled with syrup, if the drink to be dispensed is of a kind which calls for a syrup. If no syrup is required for the drink, then the flavoring is placed in one of the containers 41, the other container being permitted to remain empty. When the parts are arranged as shown in Fig. 10, the valve 25 which controls the supply of carbonated water is closed, the valves 32 being closed, and the valves 39 being open so that flavoring and syrup can flow from the containers 41 into the receptacles 34, the air escaping by way of the vent pipes 37. The operator may move the plungers 36 inwardly and outwardly, thereby to regulate the quantity of flavoring or syrup in the receptacles 34. After a coin has been inserted into the slot 77 to operate the lever 70 and to free the lever 42 as above described, the lever 42 is tilted on its fulcrum 43, the spring 45 is put under tension, the link 51 opens the valve 25 to permit the passage of carbonated water, the links 52 close the valves 39 so that no more syrup and flavoring can flow into the receptacles 34, and the links 53 open the valves 32 so as to permit the measured slugs of flavoring and syrup to flow downwardly into the outlet pipe 28 along with the carbonated water delivered into the said pipe from the cross pipe 23 by way of the pipe 27. When the spigot 30 is opened, the drink will flow into a glass (not shown) on the shelf 15. The carbonated water proceeding from the tank 18 passes through the cooling member 21 within the ice chest 16, and the temperature of the carbonated water is lowered before the water is delivered into the cross pipe 23. A skilled mechanic will understand that, if desired, the ice chest 16 and the part 21 of the pipe may be omitted if desired, the pipe 20 communicating directly with the cross pipe 23. When the handle end 49 of the lever 42 is released, the spring 45 reacts on the lever, the parts being restored to the positions of Fig. 10, the valve 25 being closed, the valves 32 being closed, and the valves 39 being opened.

Having thus described the invention, what is claimed is:

1. A device of the class described, embodying a tank for charged fluid; an ingredient container; an outlet; a first conduit leading from the tank to the outlet; a second conduit leading from the container to the outlet; measuring valves journaled in the second conduit; a valve journaled in the first conduit; a lever under the control of an operator; a fulcrum for the lever; and links pivotally connected with the lever and operatively connected with the valves.

2. A device of the class described, constructed as set forth in claim 1, and further characterized by the provision of a receptacle interposed in the second conduit between the valves thereof; a vent pipe communicating with the receptacle; a tubular extension constituting a part of the receptacle; and a plunger operating in the extension.

In testimony that I claim the foregoing as my own, I have hereto affixed my signature in the presence of two witnesses.

LUTHER B. OLIVER.

Witnesses:
C. A. DILLARD,
J. R. SINGLETON.